United States Patent
Lewis et al.

(10) Patent No.: US 6,819,751 B1
(45) Date of Patent: Nov. 16, 2004

(54) METHOD OF FORWARDING DATA FROM A NETWORK ELEMENT AND AN ARRANGEMENT FOR UITILIZING DATA FROM A NETWORK ELEMENT

(75) Inventors: Peter Reginald Lewis, Rijen (NL); Brian Kilkelly, Burgess Hill (GB)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 10/258,724

(22) PCT Filed: May 1, 2000

(86) PCT No.: PCT/EP00/04391

§ 371 (c)(1),
(2), (4) Date: Jan. 17, 2003

(87) PCT Pub. No.: WO01/84857

PCT Pub. Date: Nov. 8, 2001

(51) Int. Cl.[7] .............................................. H04M 15/00
(52) U.S. Cl. ............. 379/126; 379/112.01; 379/114.01; 379/115.01; 379/121.01; 379/127.02
(58) Field of Search ............................ 379/111, 112.01, 379/112.06, 112.09, 114.01, 126, 133, 134, 137, 141, 112.05, 115.01, 115.03, 121.01, 127.02

(56) References Cited

U.S. PATENT DOCUMENTS

| | | | |
|---|---|---|---|
| 5,483,590 A | * 1/1996 | Chiu et al. ................. 379/269 |
| 5,566,235 A | 10/1996 | Hetz ........................... 379/201 |
| 5,579,371 A | * 11/1996 | Aridas et al. ............. 379/32.03 |
| 5,721,753 A | * 2/1998 | Ehler et al. .................... 379/14 |
| 5,729,588 A | * 3/1998 | Chin et al. ..................... 379/14 |
| 5,774,532 A | 6/1998 | Gottlieb et al. ............... 379/11 |
| 5,793,853 A | 8/1998 | Sbisa .......................... 379/120 |
| 5,815,559 A | * 9/1998 | Schnable ............... 379/114.01 |
| 5,987,107 A | * 11/1999 | Brown ................... 379/114.12 |
| 6,363,411 B1 | * 3/2002 | Dugan et al. ............... 709/202 |
| 6,529,504 B1 | * 3/2003 | Sbisa ......................... 370/385 |
| 6,615,034 B1 | * 9/2003 | Alloune et al. ............. 455/406 |
| 6,697,814 B1 | * 2/2004 | Porter ........................ 707/102 |
| 6,731,730 B1 | * 5/2004 | Zolotov ...................... 379/126 |

FOREIGN PATENT DOCUMENTS

DE 196 46 485 A1 5/1998 ............ H04Q/7/38

* cited by examiner

Primary Examiner—Binh Tieu

(57) ABSTRACT

This invention relates to switching and operational support systems in the area of general telecommunications and more particularly, to a new type of solution for forwarding data from a network element and to a new type of solution for utilizing data from a network element. In a method of forwarding data according to the invention the software module that supports the customer billing information data stream is adapted to include the complete usage data information for the whole network element as well as the customer billing information. This usage data stream can then be obtained by different systems for various purposes.

10 Claims, 3 Drawing Sheets

METHOD OF FORWARDING DATA FROM A NETWORK ELEMENT AND AN ARRANGEMENT FOR UITILIZING DATA FROM A NETWORK ELEMENT

FIELD OF THE INVENTION

This invention relates to switching and operational support systems in the area of general telecommunications, and more particularly, to a new type of solution for forwarding data from a network element and to a new type of solution for utilizing data from a network element.

BACKGROUND OF THE INVENTION

In a telecommunications network, network elements, such as telephony switches, are used to route and switch speech and data signals coming from another part of network. While performing this function the network element also generates a lot of data, which is then used for different purposes e.g. billing the customer for the phone call, billing another operator for the use of the network, or statistical data handling.

In an ordinary network element this data is combined to form several different data streams to come out of the network element. Such data streams are for instance customer billing information data stream, statistical information data stream, operational and maintenance (OMS) information data stream, customer complaint audit data stream and inter-operator billing information data stream.

Each stream consists of a different subset of information out of the total traffic information. Also when forming the different data streams, for example the information about a call, output relating to any one call can be presented in different formats in different data streams. This inconsistent way of processing the data can quite often later cause contradicting records.

Patent application U.S. Pat. No. 5,793,853 (Sbisa Daniel Charles), regarded as being the closest prior art, concerns a method and a system for recording billing information method for telecommunications service request, which generates individual records corresponding to a telecommunication switch providing services in response to requests, The system matches common services into single record. The method involves generating a primary record containing information relating to the services provided by a telecommunication switch in response to the request and an identification key. The primary record is transmitted from the telecommunication switch to a separate switch including a merge processor. One secondary record is generated. Each secondary record contains information relating to the services provided by a generic service platform in response to the service request and an identification key containing information associating the secondary record with the primary record. The secondary record is transmitted from the generic service platform to the merge processor. The identification keys of records received is compared at the merge processor. The associated primary and secondary records are merged to form a single network record containing information relating to the services provided by the telecommunication switch and generic service platform in response to the request. In this system the billing statements and statistical reports say be derived from the single network record.

The prior art solution stated above, does not provide an adequate solution for the increased bandwith, needed when the plurality of merge processors are linked to network elements, providing the primary records. Furthermore the prior art as stated requires a complex and costly update of said merge processors in case of a change of requirements or replacement of the network element, providing the primary records which are presented in a specific format.

In the following, the prior art solutions will be described in more detail with reference to the accompanying FIG. 1 which is a block diagram showing an arrangement for utilizing data from a network element according to prior art.

FIG. 1 shows a block diagram of an arrangement for utilizing data from a network element according to prior art. A network element is marked with reference number 1 and the data access network is marked with a reference number 2. There are several supporting systems utilizing the data from different network elements 1 such as customer billing system 3, inter-operator billing system 4 and customer care system 5 shown here, as well as network element managers 6 and 7.

A network element 1 today contains a software component module 8 that has as its function the collection, storing and outputting of call details for billing purposes e.g. the production of Call Detail Records. A network element 1 today also has additional software component modules 9–12 that have as their functions the collection, storing and outputting of call details for other purposes.

Any one call may have its details output by any one or more software component modules 8–12, however no software component module 8–12 outputs details for each and every call. The usage of multiple software component modules 8–12 causes discrepancies between the Call Detail Record output for any one call, due to internal software coordination problems.

Each of the supporting systems 3–5 and network element managers 6–7 are receiving information from the software component modules 8–12 in different network elements 1 in a form of different data streams through mediation devices 13–17 in the data access network 2. Different data streams can for instance be customer billing information data stream, inter-operator billing information data stream, customer complaint audit data stream, statistical information data stream and operation and maintenance information data stream. Each of the mediation devices 13–17 collects the data from the software component modules 8–12 in one or more network elements 1 and passes the information onwards to the supporting systems 3–5 and network element managers 6–7.

In present arrangements each of the supporting systems 3–5 and network element managers 6–7 receive data as different data streams from the software component modules 8–12 in different network elements 1. In these data streams there is forwarded only the necessary information towards the supporting systems 3–5 and network element managers 6–7. When adding a new supporting system or network element manager, one often has to arrange for a new data stream or update the existing data streams e.g. the customer billing information data stream.

Many telecommunication regulators, place regulatory requirements on the operators that raw unprocessed billing data must be archived for several years. As an expanded data stream, e.g. customer billing information data stream, would contain a lot more data than the regular data stream, the archiving requirements for this unprocessed data would drastically increase. The retrieval of additional data from the software component modules 8–12 in the different network elements 1 in the network is also hindered by the updating of old supporting systems, e.g. billing systems, that already have a high integrity and capacity demand.

All changes in the billing stream must be coordinated via the systems supporting the billing stream. This coordination usually is restricted due to integrity, security and performance issues. This resistance prevents a single usage data stream from a network element 1 being used as input to multiple systems.

In the view of the prior art there is a clear need for a method for forwarding data from a network element and for an arrangement for utilizing data from a network element that would provide a complete, unambiguous and detailed picture of traffic in the network element. Lack of such an solution has already for a quite some time been a stumbling block for the further development of the current supporting systems 3–5 and network element managers 6–7 as well as for the introduction of new supporting systems. This is due to the fact that the mediation devices and the supporting systems 3–5 in the prior art telecommunication networks are usually in-house systems and very hard to modify or update.

SUMMARY OF THE INVENTION

The aim of this invention is to overcome the drawbacks of the prior art solutions and to provide a new type of method of forwarding data from a network element and a new type of arrangement for utilizing data from a network element.

According to the first aspect of the present invention there is provided a method of forwarding data from a network element in a telecommunications network generating usage data to different data streams such as a customer billing information data stream, which is characterized by that the software module that supports the customer billing information data stream is adapted to additionally support the complete usage data information stream for the whole network element including the customer billing information. There is also provided an arrangement for utilizing data from a network element, comprising one or more network elements, a data access network and supporting systems, in which arrangement the network elements contain software component modules that, in addition to the providing of the customer billing information data streams, have as their functions the collection, storing and outputting of call details, which arrangement is characterized by that the network elements further contain software component modules that have the function of collection, storing and outputting of complete data for each and every call.

BRIEF DESCRIPTION OF THE DRAWINGS

A more complete understanding of the method and the arrangement of the present invention may be obtained by the preferred embodiments that follow, taken in conjunction with the accompanying drawings, wherein.

DETAILED DESCRIPTION OF THE PREFERRED EMBODIMENTS

The prior art solutions have been described in drawing 1. In the following, the solution according to the present invention will be described in more detail with reference to the accompanying drawings 2–3.

Figure 1:
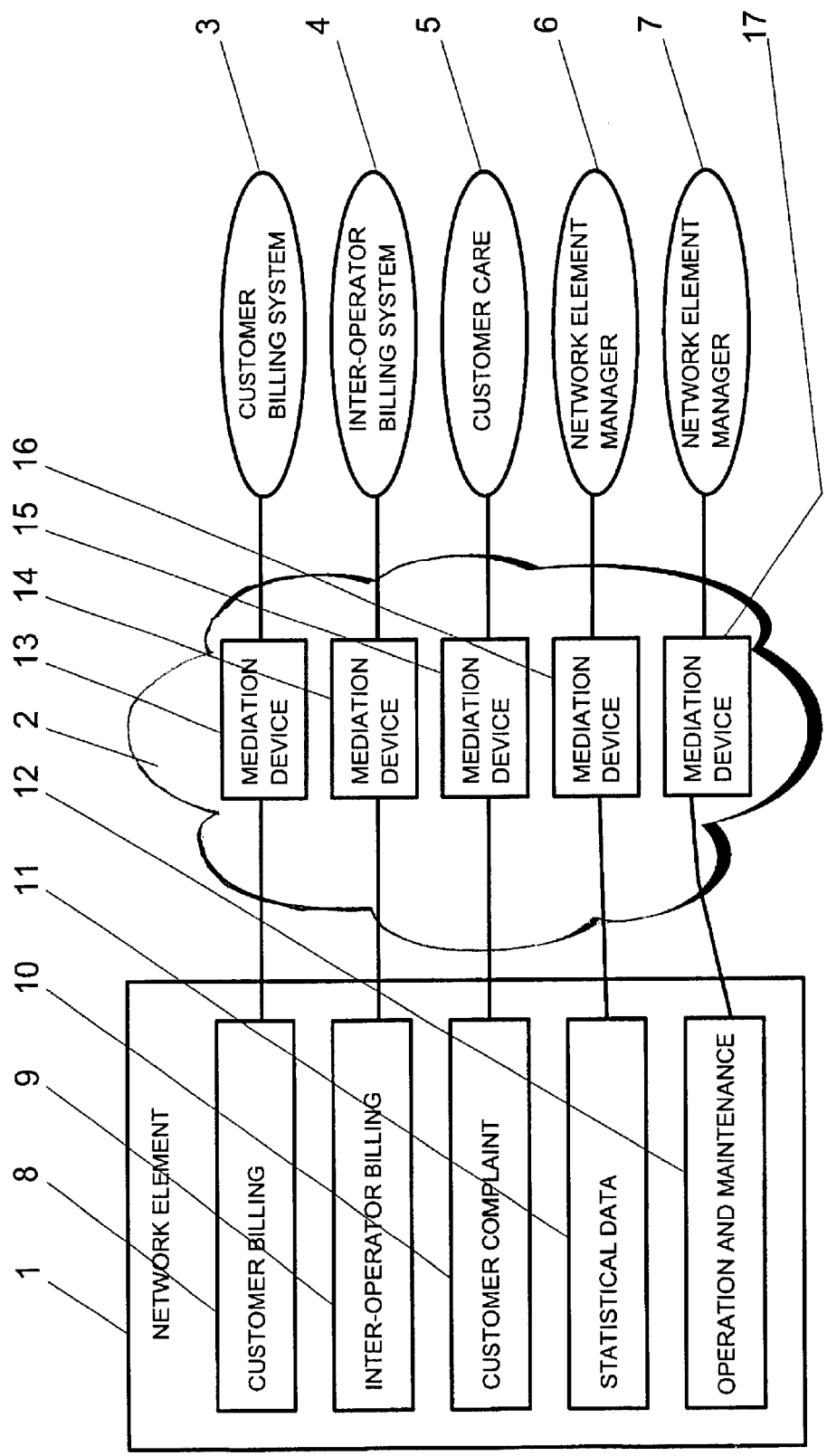
FIG. 1 is a block diagram showing an arrangement for utilizing data from a network element according to prior art.
Figure 2:
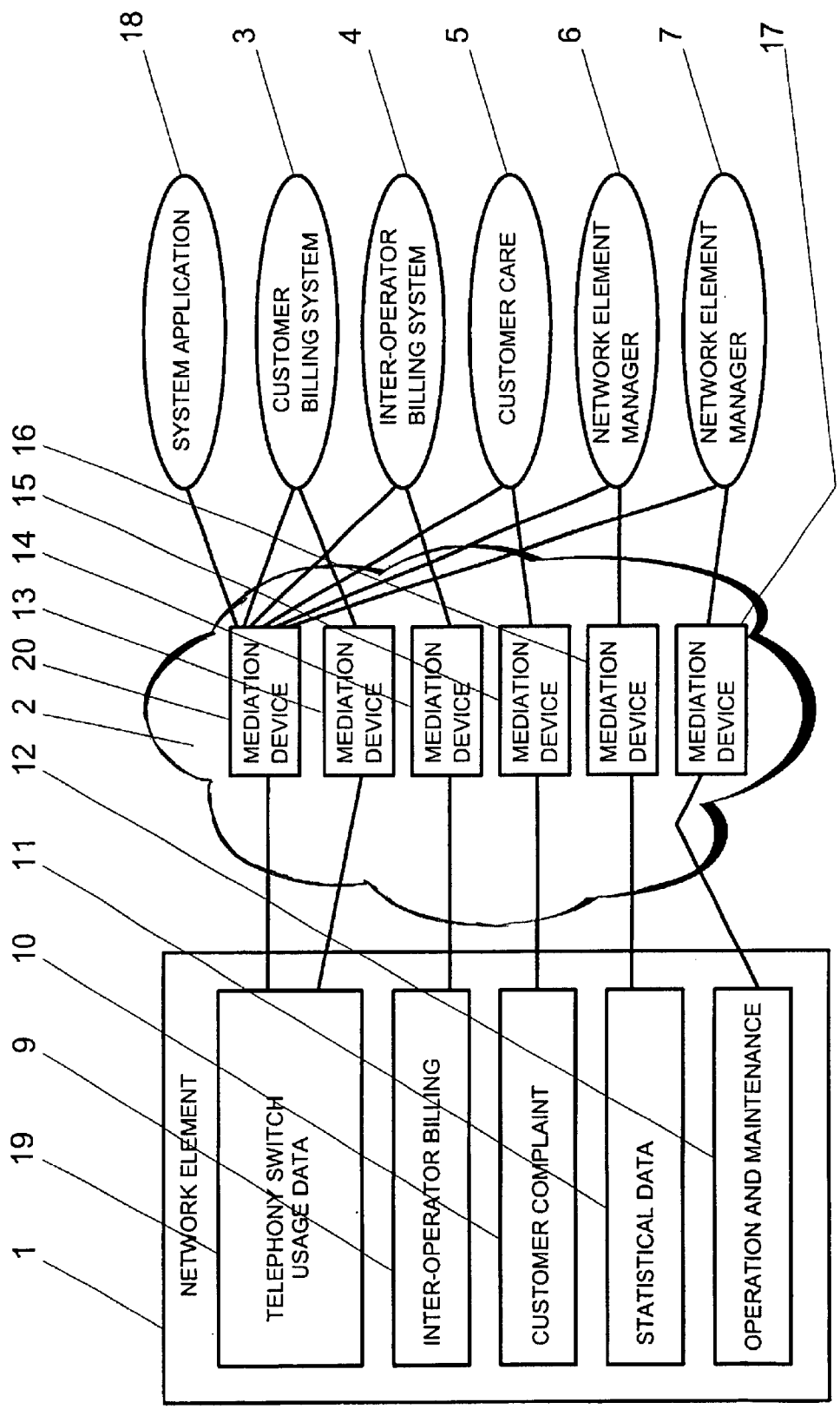
FIG. 2 is a block diagram showing an arrangement for utilizing data from a network element according to the present invention.

FIG. 2 shows a block diagram of an arrangement for utilizing data from a network element according to the present invention. A network element is marked with a reference number 1 and the data access network is marked with a reference number 2. There are several supporting systems utilizing the data from different network elements 1 such as customer billing system 3, inter-operator billing system 4 and customer care system 5 shown here, as well as network element managers 6 and 7. The arrangement is constructed so that a new system application 18 can easily be added.

In the arrangement for utilizing data from a network element according to the present invention the network element 1 contains a software component modules 9–12 that have as their functions the collection, storing and outputting of call details for different purposes. Furthermore the network element 1 contains a software component module 19 that, in addition to the providing of the customer billing information data stream, has as its function the collection, storing and outputting of complete data for each and every call, irrespective of the billing philosophies of the operator.

In the arrangement according to the present invention there is a mediation device 20 in the data access network that receives information from the software component module 19. The mediation device 20 stores the data internally and then produces multiple Call Detail Records on different data streams from the same data for different supporting systems 3–5, 18 and network element managers 6, 7. Thus for each and every call a Call Detail Record is created on the new usage stream from the software component module 19, but Call Detail Records that are forwarded from the mediation device 20 to the different supporting systems 3–5, 18 and network element managers 6, 7 are only created according to the existing criteria of the respective supporting system 3–5, 18 or network element manager 6, 7.

Each of the supporting systems 3–5 and network element managers 6–7 can be selected to receive information from one of two data streams. The data can be received either from the software component modules 9–12 or from the software component modules 19 in different network elements 1. The supporting systems 3–5 and network element managers 6–7 can thus choose between the different data streams through mediation devices 13–17 and the mediation device 20 in the data access network 2.

Figure 3:
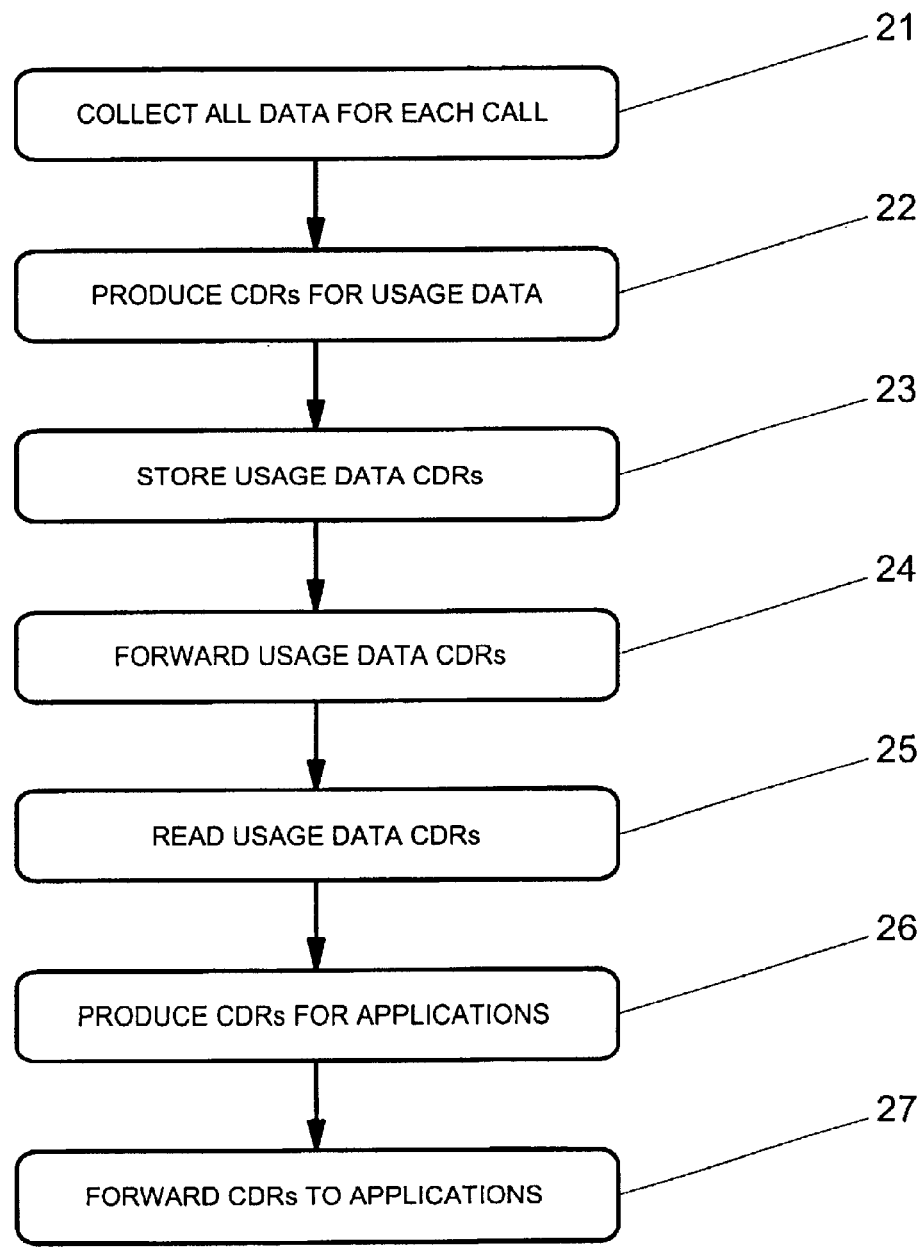
FIG. 3 is a flowchart diagram of a method of forwarding data from a network element according to the present invention.

FIG. 3 shows a flowchart diagram of a method of forwarding data from a network element according to the present invention. In a method of forwarding data from a network element in a telecommunications network generating usage data to be combined to different data streams such as a customer billing information data stream according to the present invention, the software module that supports the customer billing information data stream is adapted to additionally support the complete usage data information stream for the whole network element including the customer billing information.

Mediation device 20 is then used to filter out the customer billing information towards the customer billing system 3 and then the relevant statistical data as well as operational and maintenance information data to different supporting systems 4, 5, 18 and network element managers 6, 7.

When including the complete usage data information for the whole network element in addition to the data stream in addition to the customer billing information first complete data for each and every call is collected 21, irrespective of the billing philosophies of the operator.

Next for each and every call there are Call Detail Records produced 22 on the new usage data stream. After this the Call Detail Records of the usage data stream are internally stored 23. The Call Detail Records of the usage data stream are then forwarded 24 to the mediation device 20.

The mediation device 20 reads 25 the Call Detail Records of the usage data stream into memory and further produce 26 multiple Call Detail Records for different supporting systems 3–5, 18 and network element managers 6, 7. The mediation device 20 then forwards 27 these Call Detail Records to different supporting systems 3–5, 18 and network element managers 6, 7.

The existing billing stream is left untouched by updating the customer billing software component to produce a detailed usage data stream from the network element. While a new usage data stream from software component module 19 has been added, the original data streams from software component modules 9–12, 19 are still optionally retrievable.

As well as the detailed call information produced 22 by this new usage data stream also details for subscriber service usage are also produced independently from the billing philosophy or any other philosophy.

The solution according to the present invention with the new usage data stream can be used to replace the existing additional data streams such as for example inter-operator billing information data stream, customer complaint audit data stream, statistical information data stream and operational and maintenance information data stream.

With the help of the solution according to the present invention the number of data streams from each network element is reduced. This will also bring benefits to the maintenance and to the configuration of the links. The removal of the software components supporting the additional data streams improves the capacity and in service performance of the telephony exchange.

With the help of the solution according to the present invention new system applications 18 requiring new type of call related information, e.g. calls to be itemized, can be installed without on-switch administration. This is because the data stream with the correct characteristics is already present.

In the solution according to the present invention, when the new usage data stream is used to feed all the support systems, there are no data inconsistencies between the billing stream and the usage stream. There can be made correlation between the customer billing system 3 and other operational support systems 4–5, 18 and network element managers 6, 7.

The solution according to the present invention enables one data stream with an unambiguous collection of Call Detail Records representing the complete traffic in the exchange. The solution enables this data stream to be obtained by different systems for various purposes.

What is claimed is:

1. A method of collecting and communicating telecommunication data within a telecommunication network, said method further comprising the steps of:
   collecting a plurality of data within said telecommunication network wherein said plurality of data represents usage data associated with a telecommunications element within said telecommunications network wherein said plurality of data are independent of any particular data receiver;
   storing said collected plurality of data within a mediation element;
   identifying a plurality of data receivers for receiving certain of said plurality of data;
   generating a separate data record for each of said plurality of data receivers wherein said data record includes certain of said plurality of data specified by each of said data receiver;
   transmitting each of said data records to said identified data receiver; and wherein each of said data receiver is selectively capable of receiving a second data record including said certain of plurality of data specified by said each data receiver and transmitted by said telecommunications element to said each data receiver.

2. The method of claim 1 wherein said mediation element further stores criteria data received from a particular data receiver indicating certain portion of said plurality of data to be communicated to said data receiver.

3. The method of claim 1 wherein said data record comprises Call Detail Records (CDR).

4. The method of claim 1 wherein said data receivers include customer billing system.

5. The method of claim 4 wherein said data receivers include Network Element Manager System.

6. A telecommunications network including a plurality of network elements for processing and transporting data therein and a plurality of network applications for collecting and analyzing usage data associated with processing and transporting said data within said network, further comprising:
   a mediation device communicably coupled between said plurality of network elements and said plurality of network applications wherein said mediation device further comprising:
   a receiving module for receiving first data from one or more of said plurality of network elements wherein said first data represents usage data generated by said network elements and wherein said first data are independent of any particular network application;
   a record for storing criteria data indicating certain ones of said usage data to be forwarded to each of said plurality of network applications wherein each network application is associated with different criteria; and
   a transmitter module for transmitting a different data record to each of said network applications wherein said data record includes only those data within said first data identified by said criteria data associated with said each of said network applications; wherein each of said network applications is selectively capable of receiving a second data record transmitted by a particular one of network elements wherein said second data record includes only those data identified be said criteria data associated with said network element.

7. The telecommunications network of claim 6 wherein said particular one of said plurality of network elements is selectively capable of receiving data record from said second mediation device.

8. The telecommunications network of claim 6 wherein said data record comprises Call Detailed Record (CDR).

9. The telecommunications network of claim 6 wherein said plurality of network applications include customer billing system.

10. The telecommunications network of claim 6 wherein said plurality of network applications include Network Element Manager for providing operational and maintenance (OMS) support.

* * * * *